US010711651B2

(12) United States Patent
Hülfenhaus et al.

(10) Patent No.: US 10,711,651 B2
(45) Date of Patent: Jul. 14, 2020

(54) ROTATING DEVICE FOR A GAS TURBINE AND METHOD FOR ROTATING A COMPONENT

(71) Applicant: Siemens Aktiengesellschaft, Munich (DE)

(72) Inventors: Armin Hülfenhaus, Langenfeld (DE); Gang Yi Li, Shanghai (CN)

(73) Assignee: Siemens Aktiengesellschaft, Munich (DE)

(*) Notice: Subject to any disclaimer, the term of this patent is extended or adjusted under 35 U.S.C. 154(b) by 452 days.

(21) Appl. No.: 15/021,491

(22) PCT Filed: Aug. 21, 2014

(86) PCT No.: PCT/EP2014/067828
§ 371 (c)(1),
(2) Date: Mar. 11, 2016

(87) PCT Pub. No.: WO2015/039830
PCT Pub. Date: Mar. 26, 2015

(65) Prior Publication Data
US 2016/0222829 A1    Aug. 4, 2016

(30) Foreign Application Priority Data

Sep. 19, 2013  (EP) .................................... 13185127

(51) Int. Cl.
*F01D 25/34*   (2006.01)
*F01D 25/28*   (2006.01)
(Continued)

(52) U.S. Cl.
CPC ........... *F01D 25/34* (2013.01); *F01D 25/246* (2013.01); *F01D 25/285* (2013.01); *B23P 6/002* (2013.01);
(Continued)

(58) Field of Classification Search
CPC ...... F01D 25/246; F01D 25/34; F01D 25/285; F01D 25/28; F05D 2230/68; F05D 2230/70; F05D 2260/83; F04D 29/60; B23P 6/002
See application file for complete search history.

(56) References Cited

U.S. PATENT DOCUMENTS 5,575,607 A * 11/1996 Grout ..................... B66C 19/00
                                                  212/344
5,779,442 A *  7/1998 Sexton .................... F01D 11/24
                                                  415/173.2
(Continued)

FOREIGN PATENT DOCUMENTS

CN    101569989 A    11/2009
CN    101946072 A     1/2011
(Continued)

OTHER PUBLICATIONS

JP Office Action dated Apr. 3, 2017, for JP patent application No. 2016-515397.
(Continued)

*Primary Examiner* — Todd E Manahan
*Assistant Examiner* — Katheryn A Malatek
(74) *Attorney, Agent, or Firm* — Beusse Wolter Sanks & Maire

(57) ABSTRACT

A rotating device for an at least partially opened gas turbine, is designed for being mounted on a parting line of the housing of the at least partially opened gas turbine by way of at least one connecting portion, wherein the rotating device has at least one first fastening portion, which is designed for mechanically interacting with a force-transmitting connection, in particular at least one traction cable, in order to pass on mechanically a rotating movement of at least one component of the at least partially opened gas turbine, wherein it has at least one sleeve, which has at least (Continued)

one second fastening portion, wherein the sleeve is designed for being connected non-positively to the gas turbine rotor.

18 Claims, 5 Drawing Sheets

(51) Int. Cl.
  *F01D 25/24*   (2006.01)
  *B23P 6/00*   (2006.01)
  *F04D 29/60*   (2006.01)

(52) U.S. Cl.
  CPC .............. *F01D 25/28* (2013.01); *F04D 29/60* (2013.01); *F05D 2220/32* (2013.01); *F05D 2230/68* (2013.01); *F05D 2230/70* (2013.01); *F05D 2260/83* (2013.01)

(56) References Cited

U.S. PATENT DOCUMENTS

| | | | | |
|---|---|---|---|---|
| 6,224,332 | B1 * | 5/2001 | Leach | F01D 25/243 415/126 |
| 2009/0265908 | A1 * | 10/2009 | Corn | F01D 25/285 29/426.1 |
| 2010/0071183 | A1 | 3/2010 | McCarvill | |
| 2010/0083499 | A1 | 4/2010 | Shigemoto et al. | |
| 2010/0296926 | A1 | 11/2010 | Arase et al. | |
| 2011/0162179 | A1 * | 7/2011 | Howes | F01D 5/3046 29/23.51 |
| 2013/0015752 | A1 * | 1/2013 | Gerengi | F01D 5/005 312/237 |
| 2014/0150248 | A1 | 6/2014 | Corn et al. | |

FOREIGN PATENT DOCUMENTS

| | | |
|---|---|---|
| DE | 102009003833 A1 | 10/2009 |
| EP | 1052377 A1 | 11/2000 |
| EP | 1052377 A2 | 11/2000 |
| EP | 2169184 A2 | 3/2010 |
| EP | 2535530 A2 | 12/2012 |
| GB | 2339858 B | 4/2002 |
| JP | H08296406 A | 11/1996 |
| JP | H09317406 A | 12/1997 |
| JP | 2000356108 A | 12/2000 |
| JP | 2009264379 A | 11/2009 |
| JP | 2010077966 A | 4/2010 |
| SU | 168730 A1 | 4/1968 |
| WO | 2008012195 A1 | 1/2008 |

OTHER PUBLICATIONS

RU Office Action dated Jul. 20, 2017, for RU patent application No. 2016114981/06.

CN Office Action dated Nov. 30, 2016, for CN patent application No. 201480051795.7.

* cited by examiner

ROTATING DEVICE FOR A GAS TURBINE AND METHOD FOR ROTATING A COMPONENT

CROSS REFERENCE TO RELATED APPLICATIONS

This application is the US National Stage of International Application No. PCT/EP2014/067828 filed Aug. 21, 2014, and claims the benefit thereof. The International Application claims the benefit of European Application No. EP13185127 filed Sep. 19, 2013. All of the applications are incorporated by reference herein in their entirety.

FIELD OF INVENTION

The invention relates to a rotating device for an at least partially opened gas turbine and to a method for rotating a component of a gas turbine partially opened in this manner.

BACKGROUND OF INVENTION

In order to be able to carry out maintenance work or repairs to components of a compressor or of a turbine of a gas turbine, it is often necessary to at least partially open the gas turbine in order to thus gain access to the components which are to be manipulated. To that end, in particular casing parts or parts of the guide apparatus are removed in order to thus allow access to the components. Depending on the repair or maintenance, it may also be necessary to remove the gas turbine rotor which is surrounded by an already partially opened casing or guide apparatus. This allows access for example to those parts of the guide apparatus or of the casing which are underneath the gas turbine rotor.

Partial opening of a gas turbine is very technically demanding and involves large costs for the operator of the gas turbine. In order to keep the maintenance times or repair times, which arise in that context, to within an economically expedient time frame, there are already proposals in the prior art for carrying out the removal of parts of the guide apparatus or of the gas turbine rotor. Thus, as shown in FIG. 5 for example, WO 2006/103152 A1 proposes, in the case of an already partially opened gas turbine, placing static rollers between the lower part of the guide apparatus 12 and the lower part of the casing 10, such that it is possible to rotate the two components with respect to one another in a pivoting movement. Alternatively, the same document proposes providing static spacing and fixing means between the gas turbine rotor 15 and the lower part of the guide apparatus 12 such that, even if the gas turbine rotor 15 pivots with the lower part of the guide apparatus 12, these can always be kept at a fixed distance with respect to one another. In both embodiments, the force for rotating the respective components is achieved with the use of a mobile crane or an overhead crane.

In addition, the prior art also discloses other devices which permit pivoting of the guide apparatus of an opened gas turbine, without in so doing concomitantly moving the gas turbine rotor. Examples of this include WO 2008/012195 A1 and EP 1 052 377 A2. Also known are devices which make it possible to replace individual components of a gas turbine rotor when the gas turbine is open. Examples of this include WO 2010/0083499 A1 and EP 2 169 184 A2.

However, it can now be necessary to pivot only the gas turbine rotor of an opened gas turbine, while the guide apparatus should remain largely undisturbed in the lower part of the casing. This is for example necessary in the context of a visual inspection of the individual rotor blades of the gas turbine rotor. The prior art contains no suggestions for this, how precise and controlled pivoting might be achieved without for example further breaking down or dismantling the gas turbine.

In that regard, it is technically necessary to propose a solution which is able to avoid the drawbacks which arise in the prior art. In particular, the solution which is to be proposed should be able to achieve rotation of a gas turbine rotor of an at least partially opened gas turbine in a precise and controlled manner and with low technical and temporal outlay.

SUMMARY OF INVENTION

These objects upon which the invention is based are achieved with a rotating device as claimed and with a method for rotating a gas turbine rotor of an at least partially opened gas turbine, by means of such a rotating device, as claimed.

In particular, these objects upon which the invention is based are achieved with a rotating device for an at least partially opened gas turbine, which is designed to be installed on a parting joint of the casing of the at least partially opened gas turbine, by means of at least one connection section, wherein the rotating device has at least one first attachment section which is designed to mechanically cooperate with a force-transmitting means, in particular at least one sheathed cable, in order to mechanically impart a rotational movement to at least one component of the at least partially opened gas turbine, wherein it comprises at least one collar having at least one second attachment section, the collar being designed to be connected in a force-fitting manner to the gas turbine rotor.

The objects upon which the invention is based are further achieved with a method for rotating a component of an at least partially opened gas turbine by means of a rotating device as described above and below, comprising the following steps:—installing at least one connection section of the rotating device on a parting joint of the casing of the gas turbine;—connecting, in a force-fitting manner, a collar to the gas turbine rotor of the gas turbine;—attaching a force-transmitting means, in particular at least one sheathed cable, to the at least one second attachment section of the collar;—attaching the force-transmitting means to the at least one first attachment section;—applying a force to the force-transmitting means in order to rotate the gas turbine rotor.

Consequently, the rotating device according to the invention can be installed on a parting joint of the partially opened casing of the gas turbine by means of a connection section. Typically, the casing has an upper casing half and a lower casing half. However, other subdivisions of the casing are possible. Consequently, the gas turbine is normally opened by separating the various casing parts from one another, in particular by taking an upper casing half off the lower. The casing parts are in this context in contact with one another via parting joints, the parting joints normally having suitable screw threads, such that the casing parts can be securely screwed to one another for connection.

According to the invention, the parting joints serve for installing the at least one connection section of the rotating device, such that the rotating device can be connected to these parting joints, for example by means of screwing, once the gas turbine has been opened, i.e. for example once one casing part has been removed. Accordingly, the rotating device is securely connected, at least in certain regions, to one or more casing part(s) of the gas turbine. In order to impart a mechanical rotational movement to a component of the gas turbine, it is now possible for a force-transmitting means to cooperate with the rotating device via at least one first attachment section. Typically, the first attachment section of the rotating device serves for supporting or redirecting forces, such that, when a force is applied to the force-transmitting means, this force can be transmitted to a component that is to be moved of the gas turbine. To that end, the force-transmitting means is typically also suitably connected to the relevant component of the gas turbine. When a force is introduced into the force-transmitting means, it is now possible, via the rotating device, for the supporting and/or deflection forces to be introduced into the opened casing of the gas turbine, wherein simultaneously a targeted rotational movement of the component of the gas turbine can be achieved.

Since the connection between the rotating device and the casing of the gas turbine is sufficiently secure, readily available force-applying means, e.g. a winch motor with an installed winch, are sufficient for introducing into the force-transmitting means the forces necessary for the rotational movement. The provision of a mobile crane, as is known from the prior art, can thus be avoided. Rather, the rotating device can be produced relatively cost-effectively and is easily stored. If necessary, the rotating device can then be connected to the at least partially opened casing of the gas turbine without in this context generating further operating costs for costly devices.

According to the invention, it is furthermore provided that the rotating device comprises at least one collar having at least one second attachment section, the collar being designed to be connected in a force-fitting manner to the gas turbine rotor. The collar thus permits the introduction of forces to apply a rotational movement to the gas turbine rotor, without in this context having to provide the gas turbine rotor itself with attachment sections. In particular, the collar has two receiving sections which are adapted to the cross-sectional circumferential shape of the gas turbine rotor such that, upon suitable installation on the gas turbine rotor, a force-fitting connection can be achieved. By applying a force to the at least one second attachment section on the collar, it is thus possible for a rotational movement, imparted via the collar, to be applied to the gas turbine rotor, which rotational movement can take place in a manner which is on one hand precise and on the other hand controlled.

In accordance with the inventive rotating device and/or method, the force-transmitting means can be provided for the purpose of rotating the gas turbine rotor. If rotating the gas turbine rotor requires a further component, a collar, via which the force-transmitting means can cooperate with the gas turbine rotor in order to impart a rotational movement, then a further component would not be absolutely necessary in the context of effecting a rotational movement of a part of the guide apparatus, provided that the gas turbine rotor is not to be pivoted. In this context, the collar has at least one second attachment section, via which the force-transmitting means can cooperate with the rotating device.

According to a first particular embodiment of the invention, it is provided that the rotating device, once installed on the casing, partially surrounds a gas turbine rotor of the at least partially opened gas turbine. FIG. 7 shows a conventional gas turbine 2 with a gas turbine rotor 15 which can take the form of a rotor having a number of rotor blades 28, 30 or individual rows of rotor blades 28, 30 and a number of guide vanes 16, 18 or individual rows of guide vanes 16, 18 disposed between the individual rows of rotor blades 28, 30. The guide apparatus 12 is supported by the outer casing 10. The guide apparatus 12 carries an array of the guide vanes 16, 18 forming parts of first and second stages, respectively of the turbine 2. The guide apparatus 12 also surrounds the rotor 15, rotatable about axis L. The rotor 15 includes a circumferential array of rotor blades 28, 30 mounted on wheels 24, 26 arranged alternately with disk spacers 27 therebetween, where the rotor blades 28, 30, wheels 24, 26 and disk spacers 27 form the body of the rotor 15. The wheels 24, 26 and the disk spacers 27 are secured to one another by axial extending bolts 32 circumferentially spaced from another about the rotor. By virtue of the gas turbine rotor 15 being partially surrounded by the rotating device, an advantageous mechanical interaction is possible between the rotating device and the gas turbine rotor or, as the case may be, parts of the guide apparatus, such that rotation is easily imparted. Particularly, the rotating device has a predetermined axis of rotation which coincides with the axis of rotation of the gas turbine rotor once the device is installed on the casing of the gas turbine. It is thus possible to transmit a rotational movement to the gas turbine rotor with little or no imbalance.

According to another particular embodiment of the invention, it is provided that the rotating device further comprises at least one adapter piece which can be mechanically connected both to the at least one connection section and to the parting joint of the casing of the gas turbine. The adapter piece can for example allow for different requirements in terms of installation on or attachment to the parting joint of the casing by means of different geometries. Equally, various adapter pieces can also, during installation, have different lengths between the parting joint and the connection section of the rotating device. It thus becomes possible to adapt the rotating device to various gas turbines without complications.

In particular, the rotating device can be installed on various casings of various gas turbines, and can be oriented centrally in relation to the axis of rotation of the gas turbine rotor.

According to another embodiment of the invention, it is provided that the at least one first attachment section is designed to support a sheathed cable and has in particular an eye, such as a movable eye. Very particularly, the eye is in the form of an eyelet or a shackle. The first attachment section thus permits suitable guiding and support of a force-transmitting means designed as a sheathed cable, such that suitable force redirection and introduction from the rotating device into the sheathed cable can be achieved. If the eye is made to be movable, advantageous and flexible operation of the rotating device and rapid and complication-free connection between the first attachment section and the sheathed cable can be achieved.

According to one embodiment of the invention, it is provided that the at least one second attachment section is designed to support a sheathed cable and has in particular an eye, such as a movable eye. In particular, the eye is once again in the form of an eyelet or a shackle. By virtue of the suitable support and guiding of the sheathed cable by the second attachment section, it is once again possible for forces to be suitably redirected to and exerted on the component to be rotated by means of the sheathed cable. In particular, if the at least one second attachment section is embodied as a movable eye, a flexible and simple connection between the sheathed cable and the second attachment section can be brought about.

According to another subsequent embodiment, which makes use of this aspect, it can be provided that the at least one collar has, at least in part, a circumferential shape which replicates the circumferential shape of a guide apparatus. As already set out above, in this context the guide apparatus is typically surrounded by the casing of the gas turbine and itself surrounds the gas turbine rotor. The guide apparatus serves primarily for flow guiding of the fluid-dynamically active regions of the gas turbine and in particular comprises the guide vanes or individual rows of guide vanes. Replicating, in certain regions, the circumferential shape of the guide apparatus allows the collar, during rotation, to bear suitably against the internal wall of the casing parts connected to the rotating device such that the rotational movement can take place with a constant separation between the outer circumferential shape of the collar and the internal walls of the casing parts. This permits controlled rotation without excessive use of force to compensate for undesirable imbalances. However, the circumferential shape of the collar follows the circumferential shape of the guide apparatus only in those regions which can be unscrewed from the casing parts. After these have been unscrewed, it is thus possible for the collar to take on the function of the unscrewed parts of the guide apparatus with respect to bracing against the casing parts.

According to another particular embodiment of the inventive rotating device, it is provided that the rotating device is essentially U-shaped, its end pieces each having a connection section for installation on a parting joint of the casing of the gas turbine. The U-shaped geometry of the rotating device not only permits simple handling but also good control of the forces necessary for bringing about rotational movement. Equally, the U-shaped geometry permits simple and advantageous installation of the rotating device as a whole, over the connection sections, to the parting joints of the casing of the gas turbine.

According to a refinement of this embodiment, it is provided that at least one first attachment section is provided in the region of the apex of the essentially U-shaped rotating device. In this context, the apex is the essentially highest point once the rotating device has been installed on the casing parts of the gas turbine, such that these permit even supporting of the rotating device against the parting joints of the casing parts. In addition, this point is easily accessible and thus promotes user-friendliness of the rotating device.

According to another particular embodiment of the inventive rotating device, there are provided at least two first attachment sections which are in particular designed to support a sheathed cable and are in particular designed as eyes, particularly as movable eyes. The at least two first attachment sections make it possible for, for example, at least two different force-transmitting means or sheathed cables to be connected to the rotating device, in order to introduce, in a controlled manner at possibly different points or at different times, different forces into the component that is to be rotated of the gas turbine. Thus, the component that is to be rotated can be rotated section-by-section over predetermined angular intervals, such that it is possible to achieve a high degree of control over the rotation procedure. Rotational security can also be increased since the rotation procedure can always be secured by means of a force-transmitting means which is connected to an attachment section.

According to a particularly cost-effective and easy-to-provide embodiment of the invention, the rotating device can comprise one or more steel beams, which are in particular designed as I-section steel beams. Steel beams of this type are typically used in the construction of frameworks and cranes, and are easily available. Also, these steel beams are particularly well-suited to the safe transmission of forces in various spatial directions.

According to a first particular embodiment of the inventive method, it is provided that the rotation of the component takes place on the basis of force control. Thus, for example, the force-transmitting means can cooperate with a suitable force-measuring device (e.g. force drum) in order to ensure force control. Force control permits a high degree of control over the rotation procedure, such that work can be performed safely and efficiently.

According to another particular embodiment of the inventive method, it is provided that the rotation takes place on the basis of angle control, in particular by means of multiple changes to the attachment between the first attachment section and the force-transmitting means and, in each case, subsequently applying a force to the force-transmitting means in order to rotate through a predefined angular range. Alternatively, it is also possible for multiple force-transmitting means to be provided, which means are acted upon simultaneously or sequentially with in each case suitable forces which result in angle-controlled rotation of the component. Rotation over a predetermined angular interval once again makes it possible to achieve a high degree of control over the rotation procedure, which permits efficient and safe work.

In the following, the invention is described in detail with reference to individual figures. In this context, it is to be noted that the figures are to be understood as merely schematic, and permit no limiting effect with respect to the enablement of the invention.

It is also to be noted that components with identical reference signs have identical technical functions.

It is also to be noted that, in the present case, the technical features presented in the figures are claimed in any combination with one another, insofar as this combination can achieve the objects upon which the invention is based.

DETAILED DESCRIPTION OF INVENTION

Figure 1:
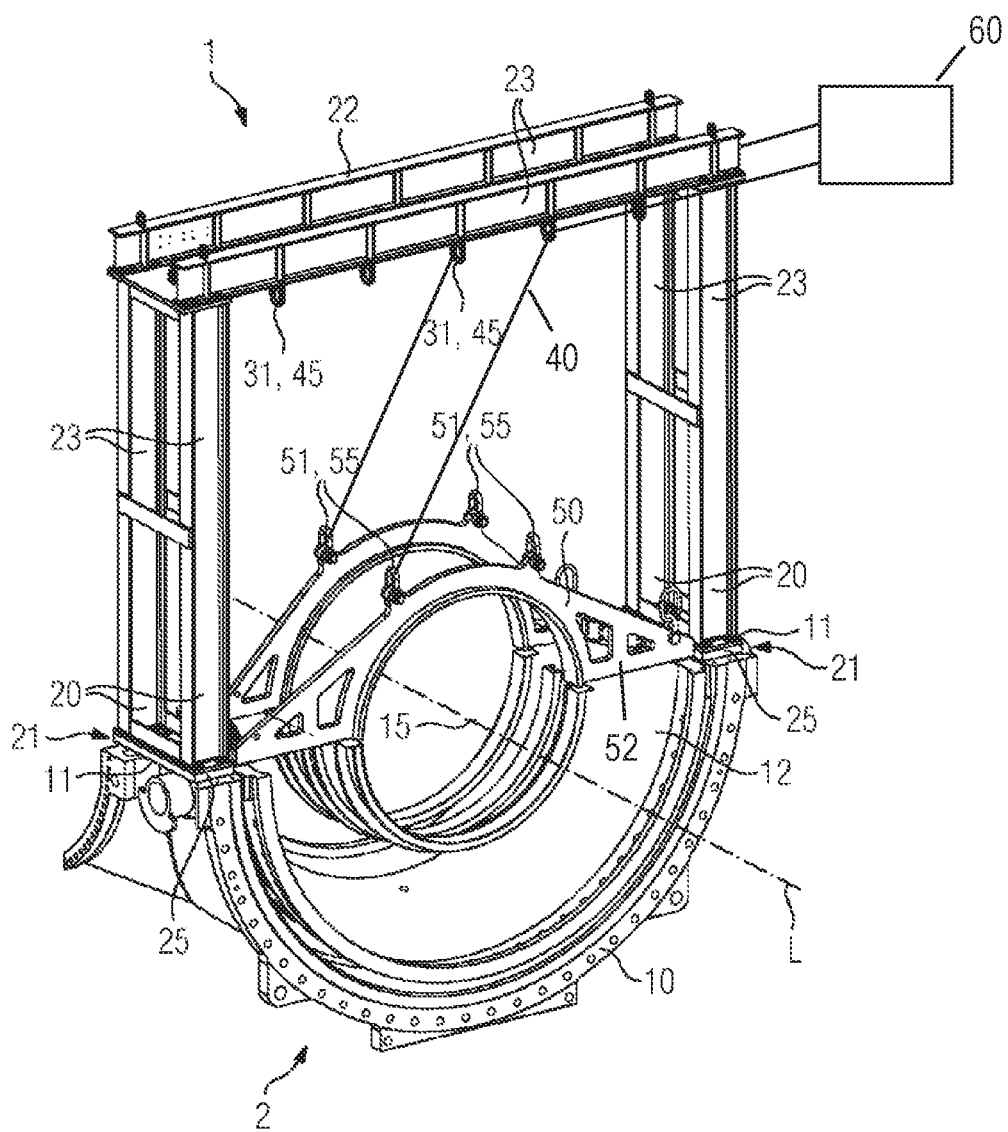
FIG. 1 shows a first embodiment of the rotating device according to aspects of the invention, in a perspective side view when installed on a casing part.

FIG. 1 shows a rotating device 1 which is installed on a parting joint 11 of the casing 10 of the gas turbine 2 by means of a connection section 21 with an adapter piece 25. The rotating device is essentially a U-shaped frame and consists of a total of six steel beams 23 that are screwed or welded to one another. The casing part of the gas turbine 2 shown is the lower casing half after removal of the upper half (no longer shown) of the casing 10, also called an outer casing 10 herein. In this lower half of the casing 10 there is also one half of a guide apparatus 12, of which the upper half of the guide apparatus 12 (not shown here) has already been removed. The lower half of the casing 10 and the lower half of the guide apparatus 12 are present essentially unrotated with respect to one another.

In order to now connect the rotating device 1 to the lower part of the casing 10, on each of two sides a connection section 21 of an end piece 20 is brought into contact with an associated parting joint 11 of the casing 10, and the two are screwed together. In the upper region of the apex 22, there are also first attachment sections 31 which are designed as eyes 45. In this context, the first attachment sections 31 are embodied such that they can suitably cooperate with a force-transmitting connection 40. In this context, the forces are supported by means of the steel beams 23 which are part of the rotating device 1, and the forces are introduced via the parting joints 11 into the lower part of the casing 10.

According to the embodiment shown here, the rotating device 1 further comprises two collars 50 which are essentially identical in shape. In this context, the collars 50 have a circular receiving section in which the gas turbine rotor 15 (not shown here) can be received. A form- and force-fitting connection between the gas turbine rotor 15 and the two collars 50 makes it possible for a force to be applied to the gas turbine rotor 15 via the collars 50. To that end, the two collars 50 each have two second attachment sections which are also embodied as eyes 55. In particular, the eyes 55 are in the form of shackles.

Furthermore, the collars 50 are provided with two support arms 52, which can be or are braced against the parting joints of the lower part of the guide apparatus 12. In particular, a screw connection and/or clamping are conceivable for bringing about this bracing. This makes it possible to achieve suitable centering of the collars 50 and uniform rotational movement of the gas turbine rotor 15 and the guide apparatus 12. Thus, if a force is applied to the collars 50, this results simultaneously in rotation of the gas turbine rotor 15, and rotation of the lower part of the guide apparatus 12.

In this context, it is normally necessary that the rotation occurs concentrically with the longitudinal axis L of the turbine rotor 15, which is not shown here. In that respect, the collars 50 encircle the gas turbine rotor 15 concentrically.

By a suitable combination of force transmissions between the first attachment sections 31 and the second attachment sections 51, it is now possible to impart rotation by means of a force-transmitting connection. In this context, it is important to ensure that a component 60 (FIG. 1), such as suitable levers are selected for imparting the rotation. A person skilled in the art will understand that selecting a relatively large lever means that a relatively small force is required for rotation.

Figure 2:
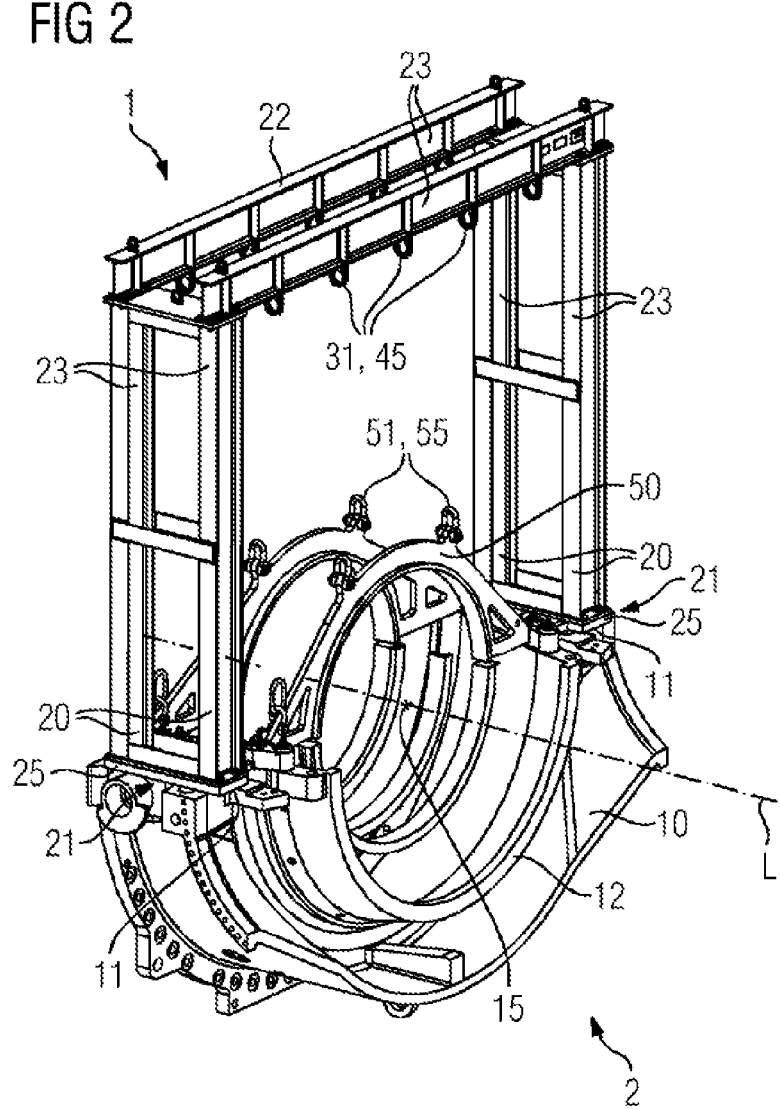
FIG. 2 shows another embodiment of the rotating device 1 according to aspects of the invention, in a perspective side view when installed on a casing part.

FIG. 2 shows another embodiment of the rotating device 1 according to the invention, which device differs from the rotating device 1 shown in FIG. 1 essentially in that a multiplicity of first attachment sections 31 are provided in the region of the apex 22 of the rotating device 1. The larger number of first attachment sections 31 thus makes it possible to achieve greater precision in the rotation procedure, in that more combinations are available which make it possible, by means of a force-transmitting connection, to connect the first attachment sections 31 to the second attachment sections 51. In particular, the multiplicity of first attachment sections 31 permits substantially well angle-controlled rotation.

A person skilled in the art will understand that it is possible to provide any number of first attachment sections 31 and any number of second attachment sections 51. It is in particular possible, according to the invention, to omit the provision of a collar 50, wherein for example a rotational movement can be imparted to the guide apparatus 12 by means of further second attachment sections 51 (not shown here) which are installed on or provided in the guide apparatus 12.

At this point, it is also to be noted that provision may be made, as force-transmitting connection 40, of any force-transmitting means that are suitable for bringing about a rotational movement. In the simplest case, this can be a sheathed cable. The advantage of the invention lies in the fact that the provision of such lightweight and cost-effective force-transmitting connection 40 makes it possible to avoid the use of mobile cranes or also overhead cranes.

Figure 3:
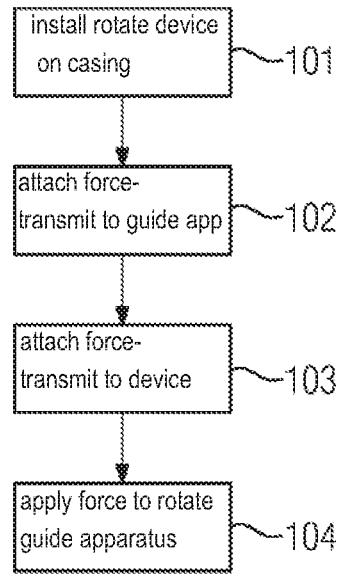
FIG. 3 shows a method as represented by a flowchart.

FIG. 3 shows an embodiment of a method for rotating a component of an at least partially opened gas turbine 2 by means of a rotating device 1 described further above, the method comprising the following steps:—installing at least one connection section 21 of the rotating device 1 on a parting joint 11 of the casing 10 of the gas turbine 2 (first method step 101);—attaching a force-transmitting connection 40, in particular at least one sheathed cable 40, to the guide apparatus 12 of the gas turbine 2 (second method step 102);—attaching the force-transmitting connection 40 to the at least one first attachment section 31 of the rotating device 1 (third method step 103);—applying a force to the force-transmitting connection 40 in order to rotate the guide apparatus 12 of the gas turbine 2 (fourth method step 104).

Figure 4:
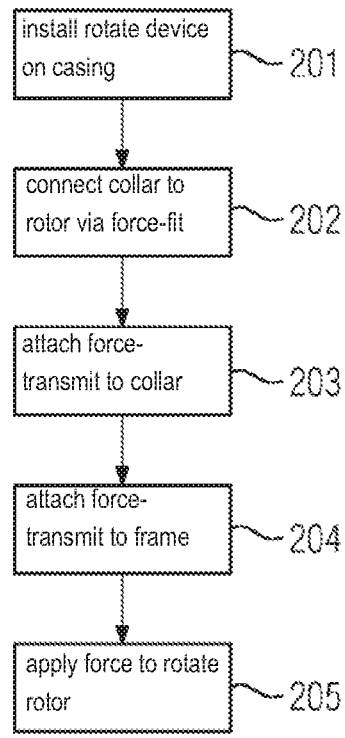
FIG. 4 shows another embodiment of the method according to aspects of the invention, as represented by a flowchart.
Figure 5:
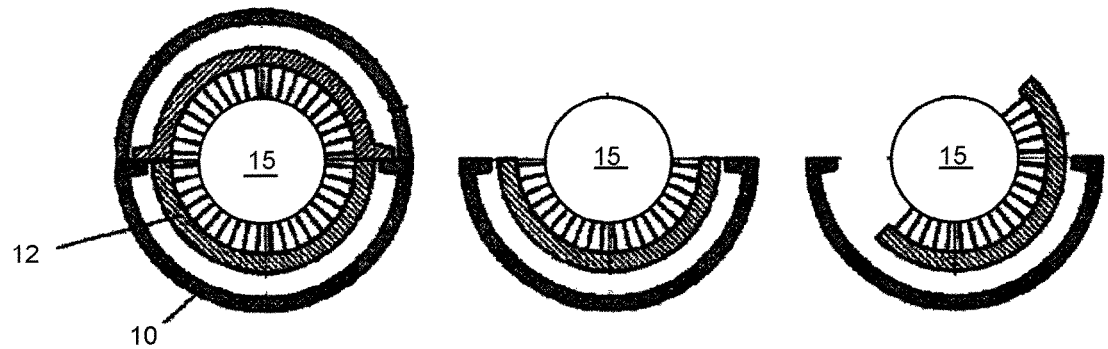
FIG. 5 shows rotation of a guide apparatus in a partially opened gas turbine in cross sectional view of the prior art.
Figure 6:
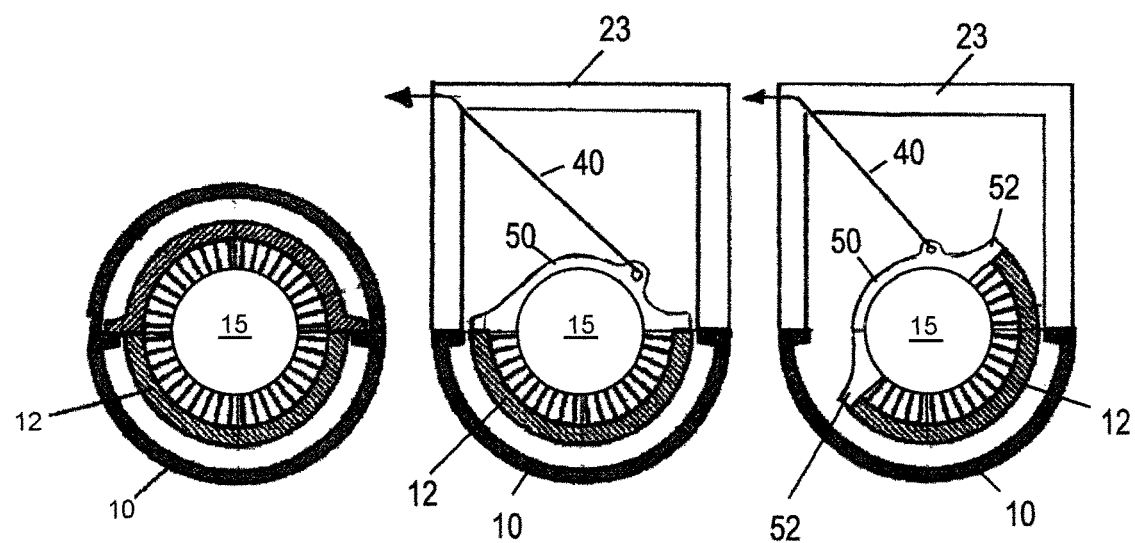
FIG. 6 shows an embodiment of the rotating device installed on a partially opened gas turbine in cross sectional view to show rotation according to the method represented by the flowchart of FIG. 4.
Figure 7:
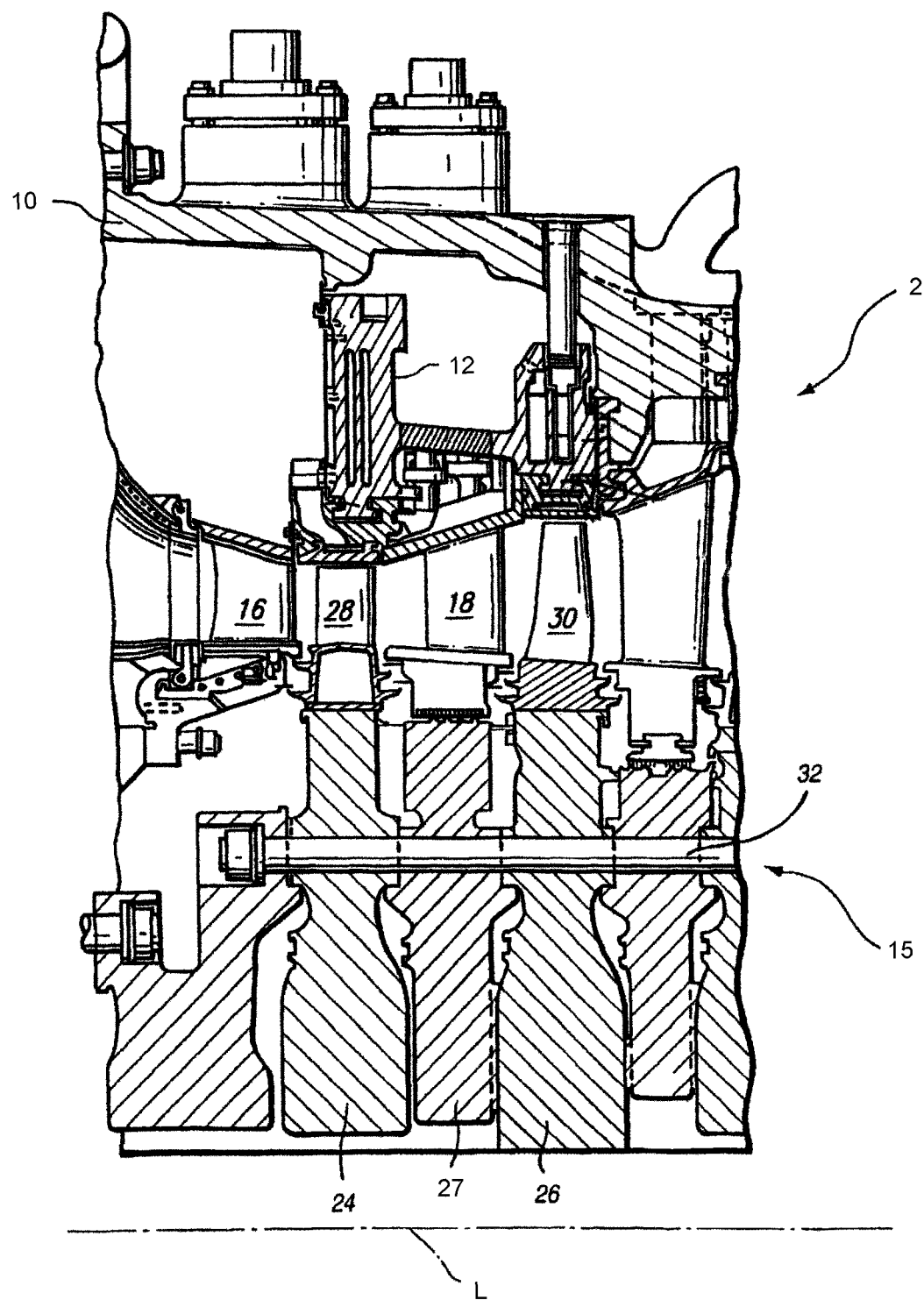
FIG. 7 shows a guide apparatus and rotor in a gas turbine in cross sectional view of the prior art.

FIG. 4 and FIG. 6 illustrate a first embodiment of the method according to the invention for rotating a component of an at least partially opened gas turbine 2, as described above, by means of a rotating device 1, also described further above, the method comprising the following steps:—installing at least one connection section 31 of the rotating device 1 on a parting joint 11 of the casing 10 of the gas turbine 2 (first method step 201);—connecting, in a force-fitting manner, the collar 50 to the gas turbine rotor 15 of the gas turbine 2 (second method step 2) by connecting the two support arms 52 to the guide apparatus 12;—attaching a force-transmitting connection 40, in particular at least one sheathed cable 40, to the at least one second attachment section 51 of the collar 50 (third method step 203);—attaching the force-transmitting connection 40 to the at least one first attachment section 31 (fourth method step 204);—applying a force to the force-transmitting connection 40 in order to rotate the gas turbine rotor 15 (fifth method step 205).

Further embodiments are to be found in the subclaims.

The invention claimed is:

1. A rotating device for rotating a rotor of a partially opened gas turbine, the partially opened gas turbine comprising a rotor, a lower half of a guide apparatus, and a lower half of an outer casing, the rotating device comprising:
   a frame configured to be installed on parting joints of the lower half of the outer casing of the partially opened gas turbine,
   a collar comprising support arms configured to be connected to parting joints of the lower half of the guide apparatus, the collar further configured to be connected in a force-fitting manner to the rotor of the gas turbine such that a semi-circular receiving section of the collar is adapted to a cross-sectional circumferential shape of the rotor so that rotation of the collar is imparted to the rotor via the collar, and a force-transmitting connection comprising a cable configured to be connected between the frame and the collar to impart a force on the collar when tensioned to rotate the collar, thereby simultaneously rotating the lower half of the guide apparatus and the rotor.

2. The rotating device as claimed in claim 1,
wherein the rotating device, once installed on the lower half of the outer casing, partially surrounds the rotor of the partially opened gas turbine.

3. The rotating device as claimed in claim 1, further comprising:
at least one adapter piece mechanically connected between the frame and the parting joints of the lower half of the outer casing of the gas turbine.

4. The rotating device as claimed in claim 1,
wherein the collar is configured to at least partially surround the rotor so to provide a mechanical interaction between the collar and the rotor so that rotation of the collar is imparted to the rotor.

5. The rotating device as claimed in claim 1,
wherein the frame comprises beams forming an inverted U-shape comprising two ends, each end configured to be secured to a respective parting joint of the lower half of the outer casing of the partially opened gas turbine.

6. The rotating device as claimed in claim 5,
wherein at least one first attachment section for the force-transmitting connection is located in a region of an apex of the frame.

7. The rotating device as claimed in claim 1, wherein the frame comprises at least two first attachment sections which are designed to support two cables at different times or different angular intervals to introduce in a controlled manner different forces to the collar at the different times or at the different angular intervals.

8. The rotating device as claimed in claim 1, wherein the force-transmitting connection receives the force from a winch or a lever on one end thereof and transmits the force to the collar connected to another end thereof.

9. A method for rotating a component of a partially opened gas turbine comprising a lower half of a guide apparatus, and a lower half of an outer casing by means of a rotating device, wherein the rotating device comprises: a frame, a collar comprising support arms, and a force-transmitting connection comprising a cable; the method comprising:
installing the frame on parting joints of the lower half of the outer casing of the gas turbine;
connecting, in a force-fitting manner, the collar to the rotor of the gas turbine by adapting a semi-circular receiving section of the collar to a cross-sectional circumferential shape of the rotor so that rotation of the collar is imparted to the rotor via the collar and connecting the support arms to parting joints of the lower half of the guide apparatus;
attaching the force-transmitting connection between the frame and the collar; and
applying a force to the force-transmitting connection in order to rotate the collar, the lower half of the guide apparatus, and the rotor.

10. The method as claimed in claim 9,
wherein rotation of the rotor takes place on a basis of a force control of the force-transmitting connection, wherein the force control is created by a winch or a lever.

11. The method as claimed in claim 9,
wherein the frame comprises at least two first attachment sections which are designed to support at least two cables to form the force-transmitting connection, wherein rotation of the rotor takes place on a basis of angle control by changing placement of the force-transmitting connection from one of the at least two first attachment sections to another of the at least two first attachment sections in order to rotate through a predefined angular range.

12. The rotating device as claimed in claim 1, wherein the collar is a first collar and the semi-circular receiving section is a first semi-circular receiving section;
wherein the rotating device further comprises a second collar comprising a second semi-circular receiving section;
wherein the second collar is spaced apart from the first collar along a longitudinal axis (L) of the rotor, where the semi-circular receiving section of each collar is adapted for receiving the rotor in a form- and force-fitting manner.

13. The rotating device as claimed in claim 4, further comprising: an eye or a moveable eye on the frame designed to support the cable.

14. The rotating device as claimed in claim 4, further comprising: an eye or a moveable eye on the collar designed to support the cable.

15. The rotating device as claimed in claim 7,
wherein the at least two first attachment sections comprise an eye or a moveable eye designed to support the cable.

16. The rotating device as claimed in claim 1,
wherein the frame comprises one or more I-section steel beams.

17. The method as claimed in claim 9,
wherein the cable comprises at least one sheathed cable.

18. The method as claimed in claim 11, wherein the angle control is imparted by multiple changes to the force-transmitting connection and the frame, for each change, subsequently applying the force in order to rotate through a respective predefined angular range.

* * * * *